(12) United States Patent
Johnson et al.

(10) Patent No.: US 9,720,718 B2
(45) Date of Patent: Aug. 1, 2017

(54) METHOD AND APPARATUS FOR THE REMOTE MANAGEMENT OF VIRTUAL NETWORK APPLIANCES

(71) Applicant: Verizon Patent and Licensing Inc., Basking Ridge, NJ (US)

(72) Inventors: Farrel D. Johnson, Stephens City, VA (US); Rick L. Ogg, Plain City, OH (US); Joseph E. Hirschinger, Hilliard, OH (US); Joseph E. Sheets, Frederick, MD (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 351 days.

(21) Appl. No.: 14/098,003

(22) Filed: Dec. 5, 2013

(65) Prior Publication Data

US 2015/0160961 A1    Jun. 11, 2015

(51) Int. Cl.
| | |
|---|---|
| *G06F 15/16* | (2006.01) |
| *G06F 9/455* | (2006.01) |
| *H04L 29/08* | (2006.01) |
| *H04L 29/06* | (2006.01) |
| *H04L 12/24* | (2006.01) |

(52) U.S. Cl.
CPC ...... *G06F 9/45558* (2013.01); *H04L 63/0272* (2013.01); *H04L 65/4084* (2013.01); *H04L 67/10* (2013.01); *G06F 2009/45562* (2013.01); *G06F 2009/45595* (2013.01); *H04L 41/0213* (2013.01); *H04L 41/0659* (2013.01); *H04L 41/0681* (2013.01); *H04L 41/082* (2013.01)

(58) Field of Classification Search
CPC .................................................. H04L 65/4084
USPC ........................................................ 709/223
See application file for complete search history.

(56) References Cited

U.S. PATENT DOCUMENTS

| | | | | |
|---|---|---|---|---|
| 8,464,335 | B1 * | 6/2013 | Sinha | G06F 21/51 713/153 |
| 2012/0059934 | A1 * | 3/2012 | Rafiq | H04L 67/1008 709/225 |
| 2014/0280799 | A1 * | 9/2014 | Hendry | G06F 15/177 709/221 |

* cited by examiner

*Primary Examiner* — Adnan Mirza

(57) ABSTRACT

An approach for remotely managing virtual network appliances (VNAs) includes establishing a management virtual circuit (VC) to a hypervisor running on a server at a customer premise, remotely deploying one or more VNAs to the hypervisor, and remotely managing the hypervisor and the one or more VNAs via the management VC.

20 Claims, 15 Drawing Sheets

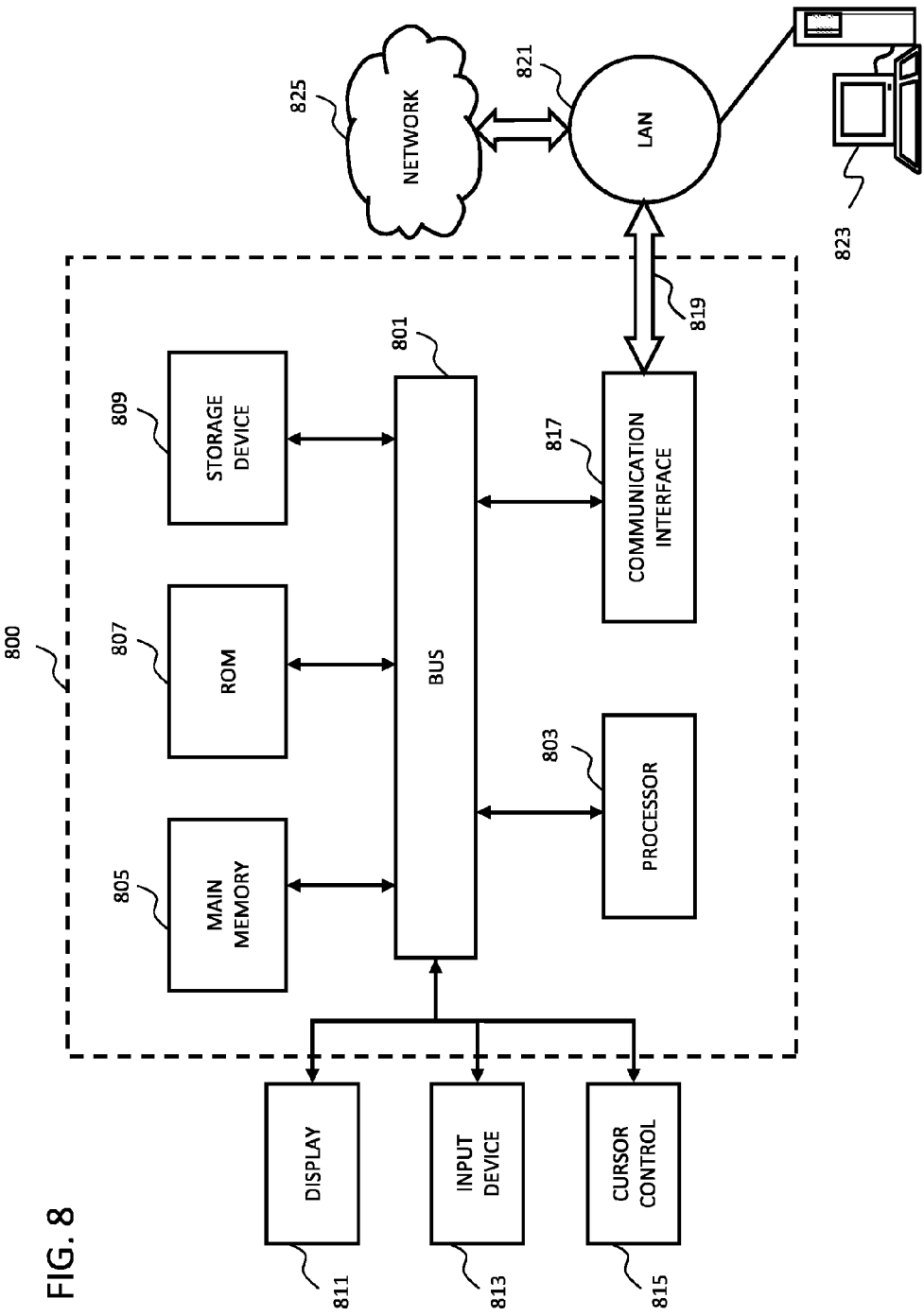

US 9,720,718 B2

METHOD AND APPARATUS FOR THE REMOTE MANAGEMENT OF VIRTUAL NETWORK APPLIANCES

BACKGROUND INFORMATION

Consumer demand for Internet-based services has led to the widespread deployment of customer premise equipment (CPE) to provide various connectivity functions. The growth of home networking technologies has further expanded the range of devices installed at customer premises. The increased amount of voice, video and data traffic is driving the market for premise-based services. This growth is only expected to increase over time and the resulting costs of maintaining a complex assortment of CPE is also expected to increase. The cost of configuring new features and services on hardware network appliances is particularly burdensome because of the cost of sending technicians to customer sites.

Based on the foregoing, there is a need for an efficient approach to the remote management and support of network appliances installed at customer premises.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 8 is a diagram of a computer system that can be used to implement various exemplary embodiments.

DESCRIPTION OF THE PREFERRED EMBODIMENT

An apparatus, method, and software for remotely managing VNA, is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to remote management of virtual appliances for a telecommunications service provider, it is contemplated that these embodiments have applicability to systems operated by different organizations and to other operations wherein virtual appliances are remotely managed.

As used herein, the term "virtual network appliance" or "VNA" may be used to refer to any virtualized network appliance hardware. In one embodiment, the virtualization of a network appliance may be performed by a bare-metal hypervisor. As used herein, the term "hypervisor" may be used to refer to a combination of software, firmware, or hardware that creates and hosts one or more virtual machines (VM). The term "bare metal" may be used to describe a hypervisor that executes directly on the host server hardware. It is contemplated that various other hypervisor configurations may also be referred to as hypervisors, including a configuration in which the hypervisor itself runs within a conventional operating system environment. It is further contemplated that VNA may include any appliance with network connectivity. For example, VNA may include routers, firewalls, local area networks, wireless controllers, telephony devices, private branch exchanges (PBX), load balancers, etc.

Figure 1A:
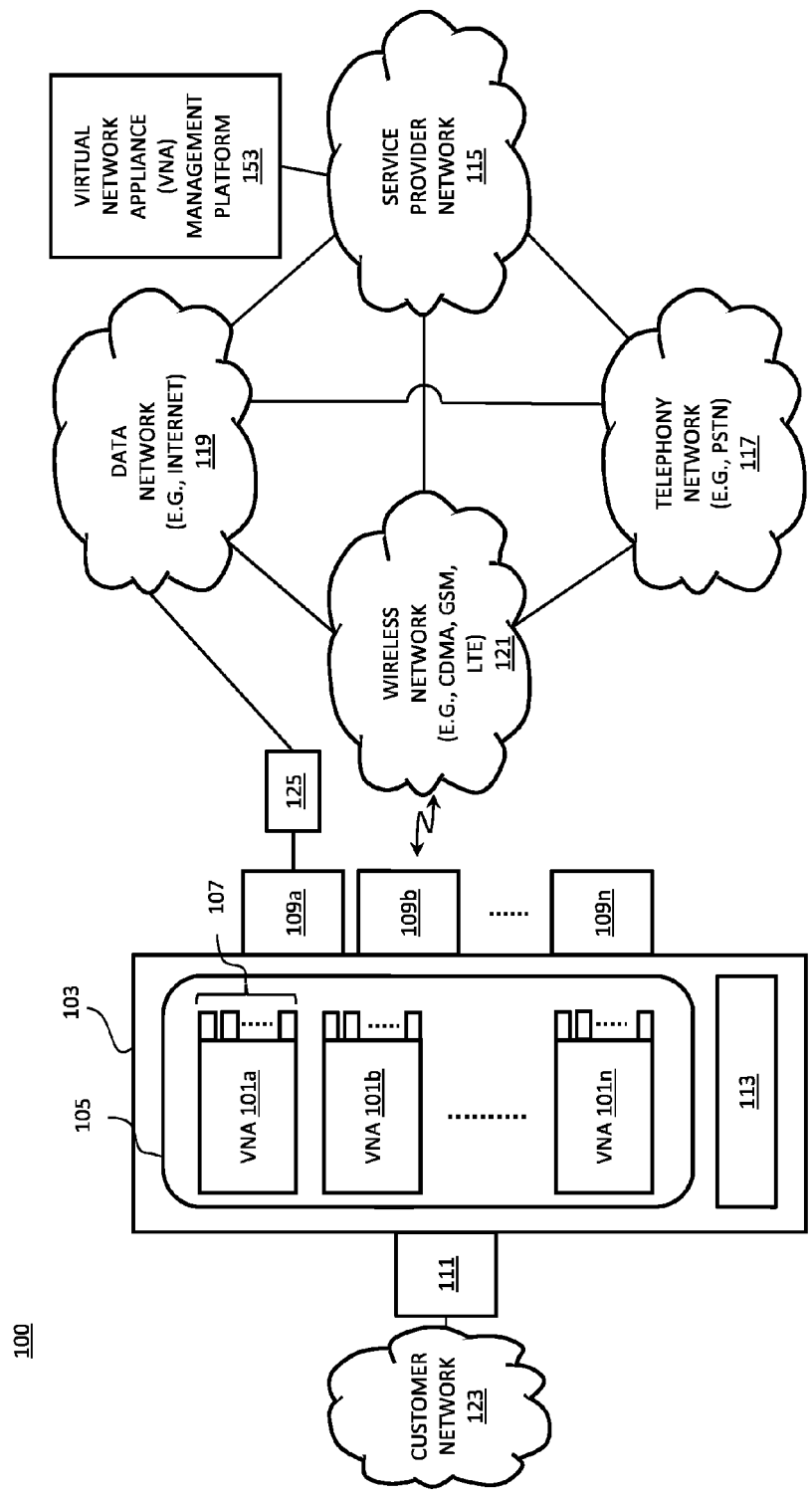
FIG. 1A is a diagram of a system capable of remotely managing virtual network appliances (VNAs), according to an exemplary embodiment.

FIG. 1A illustrates a system 100 capable of remotely managing a VNA, according to an exemplary embodiment. As shown in FIG. 1A, the system 100 includes one or more VNA 101a-101n (collectively referred to as VNA 101) at the server 103. In one embodiment, the VNA 101 correspond to VM hosted by the hypervisor 105 installed on the server 103. Each of the VNA 101 (e.g., VNA 101a) may have one or more virtual interfaces (e.g., virtual interfaces 107). In one embodiment, the virtual interfaces 107 are software implementation of hardware interfaces and are utilized for the transmission and receipt of messages among the VNA 101 and with the physical interfaces 109a-109n (collectively referred to as physical interfaces 109) and 111. A virtual interface may be configured in the same manner as the corresponding physical interface of a network appliance such that the operation of the virtual interfaces is transparent to the VNA 101. In one embodiment, the virtual interfaces may be configured to connect to the physical interfaces 109 and 111 via an Ethernet virtual circuit (EVC). For example, a virtual interface may be configured to be part of specific virtual local area network (VLAN). Virtual interfaces configured to be part of the same VLAN may exchange messages with each other according to the same communication protocols as a VLAN configured at physical interfaces. In one embodiment, the hypervisor 105 may create a VLAN to allow communication between the VNA 101 and the physical interfaces 109).

The server 103 may include a remote access controller 113. In one embodiment, the remote access controller 113 includes a programmed read-only memory (ROM) with system bootstrap instructions. For example, the remote access controller 113 may cause the server 103 to load the hypervisor 105 into system memory and initialize at least one default physical interface (e.g., physical interface 109a). The default physical interface may be utilized to connect to the networks 115-121. In one embodiment, the remote access controller 113 may also be caused to create virtual circuits (VCs) between the hypervisor 105, the VNA 101, and the physical interfaces 109.

The server 103 and the customer network 123 may reside at a customer premise. In one embodiment, the server 103 connects to the networks 115-121 via a network interface device (NID) 125 that attaches to a default physical interface (e.g., physical interface 109a). The NID may be a modem or other signaling device that allows communication over the networks 115-121. In one embodiment, a service provider may supply and service the NID. For example, the NID may be fiber optic or cable termination unit. The customer premises may be supplied with multiple NIDs depending on the size of the customer network and the number of servers. In one embodiment, the NID may be utilized to provide access into a converged Ethernet access (CEA) network. For example, a customer may purchase one or more EVC into the CEA network where each EVC maps to a specific VLAN. In one embodiment, the VLAN traffic is forwarded, or otherwise communicated, over an Ethernet trunk configured at a physical interface (e.g., physical interface 109a). In one embodiment, the hypervisor 105 determines the VNA that can access a particular VLAN of the CEA network.

For illustrative purposes, the networks 115-121 may be any suitable wireline and/or wireless network, and be managed by one or more service providers. For example, telephony network 117 may include a circuit-switched network, such as the public switched telephone network (PSTN), an integrated services digital network (ISDN), a PBX, or other like network. Wireless network 121 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 119 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 115-121 may be completely or partially contained within one another, or may embody one or more of the aforementioned infrastructures. For instance, the service provider network 115 may embody circuit-switched and/or packet-switched networks that include facilities to provide for transport of circuit-switched and/or packet-based communications. It is further contemplated that networks 115-121 may include components and facilities to provide for signaling and/or bearer communications between the various components or facilities of system 100. In this manner, networks 115-121 may embody or include portions of a signaling system 7 (SS7) network, or other suitable infrastructure to support control and signaling functions.

Figure 1B:
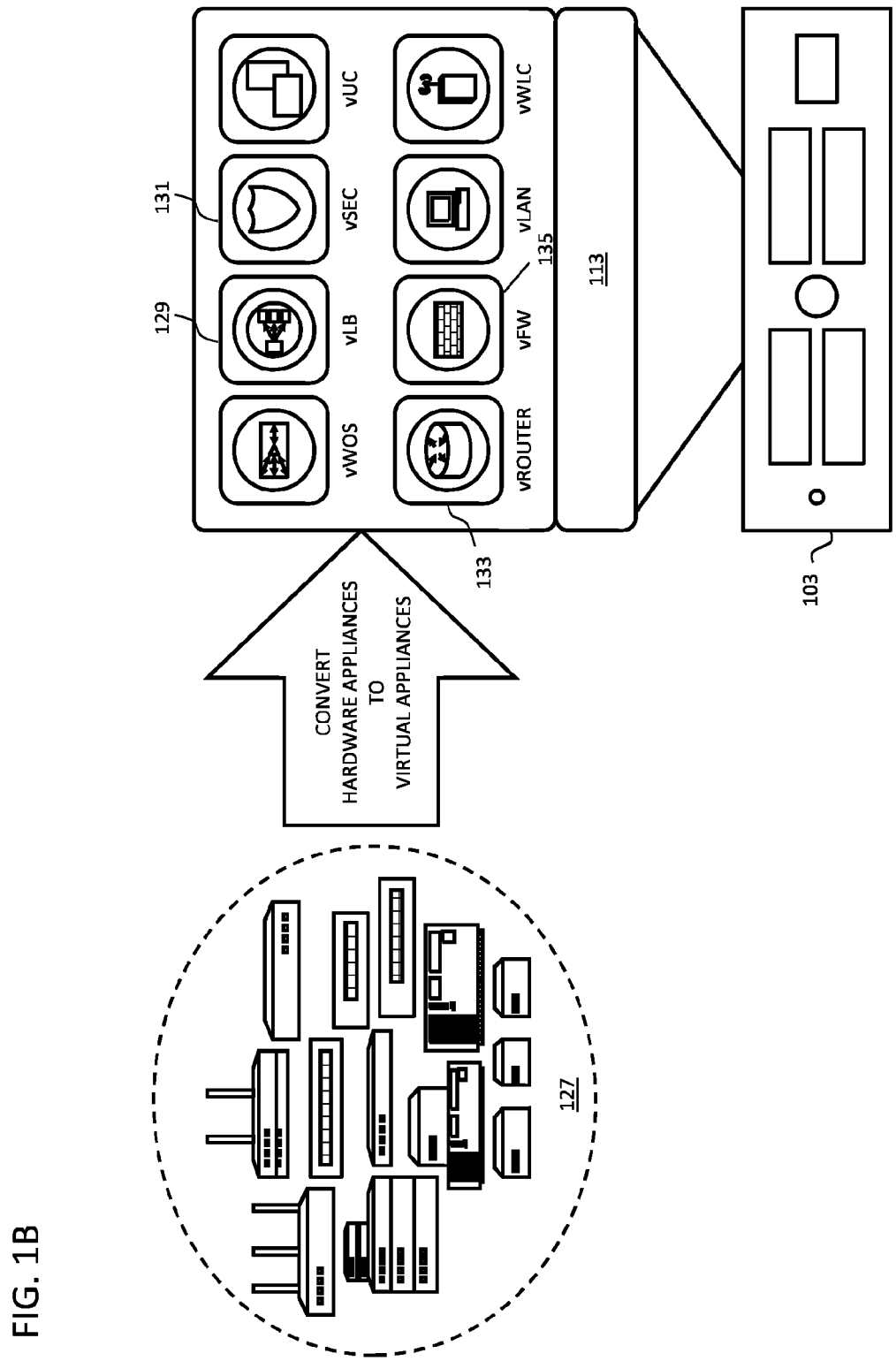
FIG. 1B illustrates a hardware virtualization process, according to an exemplary embodiment.

FIG. 1B illustrates a hardware virtualization process, according to an exemplary embodiment. In one embodiment, the server 103 hosts virtualized instances of one or more hardware network appliances 127. The hardware network appliances 127 may include, for instance, routers, firewalls, local area networks, wireless controllers, telephony devices, PBX, load balancers, etc. By way of further example, the hardware network appliances 127 may include any mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the hardware network appliances 127 can support any type of interface to the user (such as "wearable" circuitry, etc.).

The virtualization process may be described in relation to the operating system components of the hardware network appliances 127. In one embodiment, the virtualization of the hardware network appliances 127 may involve porting the software implementations of these components such that they may execute within a VM. The one or more operating systems of hardware network appliances 127 may be ported to run in the corresponding VNA 101. For example, the virtual load balancer (vLB) 129 may include the operating system components of a hardware network appliance that performs a load balancing function. In similar fashion, the virtual security (vSEC) 131, virtual router (vROUTER) 133, and virtual firewall (vFIREWALL) 135 may include the functionalities of the corresponding hardware network appliances. Each of the VNA 101 may perform the same functions as their physical counterparts, but share the physical resources of the server 103. In one embodiment, the hypervisor 105 controls the allocation of hardware resources among the VNA 101 without requiring significant modifications to the VNA 101. The degree to which the hardware network appliances 127 are virtualized may vary. At one end of the spectrum, for instance, the entire software functionality of the VNA may be ported to the server 103 (full virtualization). At the other end of the spectrum, only the most basic or fundamental functions may be ported.

Figure 1C:
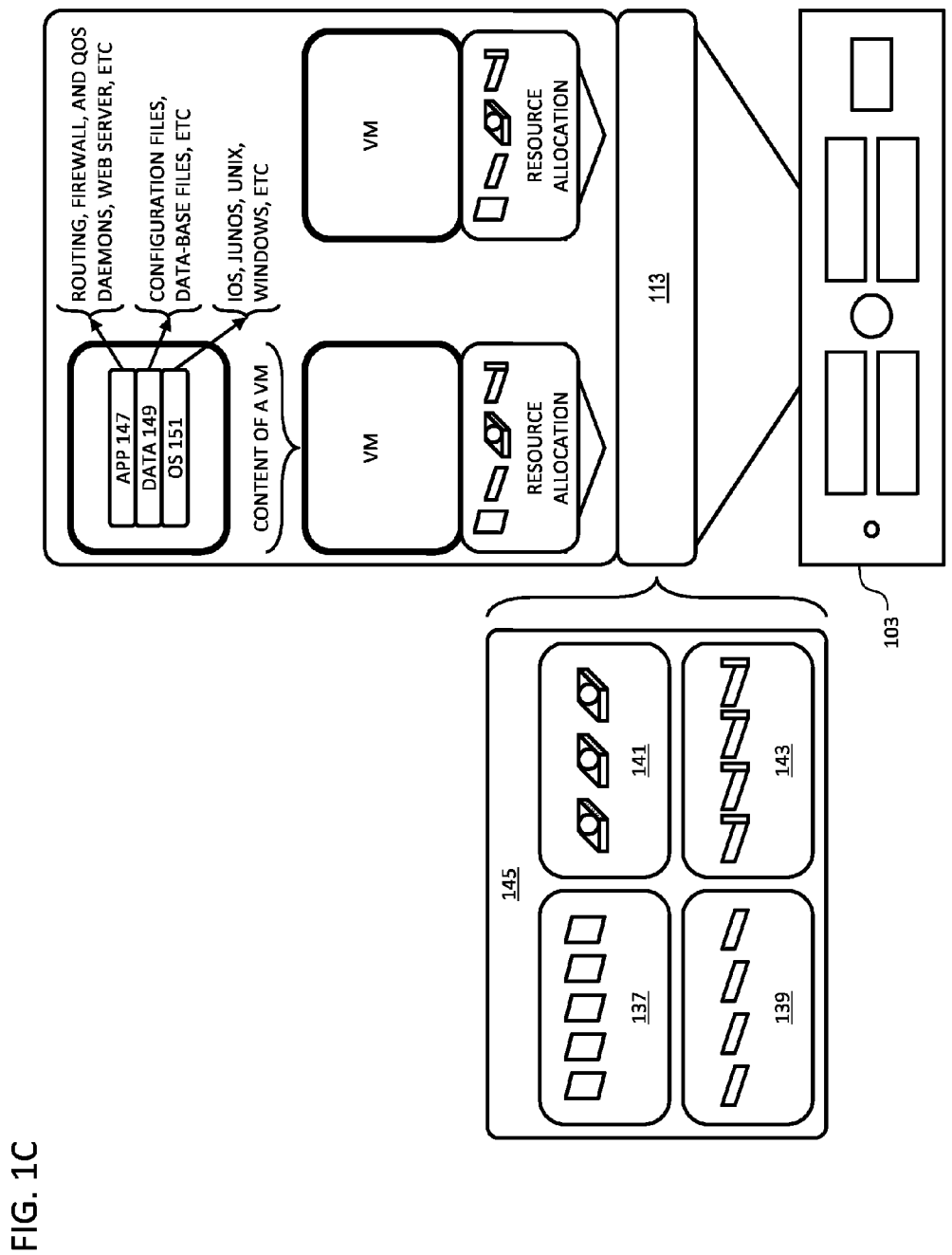
FIG. 1C illustrates an architecture of a server hosting the VNAs, according to an exemplary embodiment.

FIG. 1C illustrates an architecture of the server 103, according to an exemplary embodiment. It is contemplated that the specialized hardware of the hardware network appliances 127 may be replaced by the commoditized hardware of the server 103. In one embodiment, the server 103 may include commercial off-the-shelf components. These may include, for instance, central processing units (CPU) 137, memory 139 (e.g., random access memory (RAM)), storage 141 (e.g., discs), and network interface cards (NIC) 143 (e.g., Fast Ethernet NIC). The architecture of a specific server may depend on the system's resource requirements. For example, multiple CPU 137, storage 141, and NIC 143 may be required if the server 103 is serving a large customer (e.g., enterprise or campus environment). The service provider may categorize the configuration of the servers (e.g., server 103) according to their resource requirements. For example, the server 103 may include small, medium, and large capacity systems for various customer categories (e.g., small business, campus, building, household, public space, etc.).

The hypervisor 105 may be a commercial product available from various third-party vendors of virtualization software (e.g., VMware®, Citrix®, Oracle®, Microsoft®). In one embodiment, the hypervisor 105 is bare-metal hypervisor that hosts the VNA 101 and manages their allocation of hardware resources. For example, the hypervisor 105 may establish various resource pools 145 during initialization and then manage the allocation of hardware resources to the VNA 101. In one embodiment, the hypervisor 105 mediates hardware access requests originating from the VNA 101 and resolves conflicts when two or more VNA are attempting to obtain or access a particular resource that is unavailable or in short supply.

Each of the VNA 101 may include applications 147, data 149 and an operating system 151. The particular applications may depend on the type of VNA (e.g., router, switch, firewall, load balancer, etc.). Thus, the applications 147 may include, for instance, routing, firewall, quality of service (QoS) daemons, and web server software. For example, a virtual router may include routing and packet forwarding applications. A virtual firewall may include various security applications, including filtering and packet inspection applications. As in the case of their hardware counterparts, the virtual router and virtual firewall may be configured to receive and forward messages. For example, a virtual firewall may be configured to receive and forward messages from the networks 115-121 to a virtual router after one or more security applications of the virtual firewall have filtered the messages. In one embodiment, the virtual interfaces 107 may be configured to belong to specific VLANs. The hypervisor 105 may be utilized to configure the virtual interfaces 107 of the VNA 101 and thereby control the flow of messages among the VNA 101.

The VNA 101 may also include the data 149 and the operating system 151. The data 149 may include, for instance, configuration and database files created and accessed by the applications 147. In one embodiment, the data belonging to a particular VNA (e.g., VNA 101a) may be stored in the storage 141 that was allocated to the VNA. The hypervisor 105 may control the allocation of memory and storage resources to a particular VM. The operating system 151 may include, for instance, any public domain or proprietary operating system (e.g., Cisco Internetworking Operating System (Cisco IOS), Juniper Operating System (JUNOS), UNIX, Windows, etc.). In one embodiment, the hypervisor 105 responds to hardware access requests originating from the operating systems 151 and performs various device driver functions.

As shown, the hypervisor 105 controls the creation of the VNA 101. In one embodiment, a VNA may be instantiated and initialized when the hypervisor 105 boot ups. The hypervisor 105 may control the allocation of hardware resources to the VNA. As described above, the hypervisor 105 may allocate the hardware resources out of various CPU, memory, storage, and network resource pools. In one step of the instantiation process, the hypervisor 105 may create the virtual interfaces 107 associated with the VNA 101 and also configure connections between the virtual interfaces 107 as well as between the virtual interfaces 107 and the physical interfaces 109.

The approach of the system 100 stems, in part, from the recognition that the cost of installing, managing, and supporting hardware network appliances is a significant drain on the operating costs of the service provider.

To address these problems, the system 100 utilizes the VNA 101 to replace hardware network appliances in order to reduce management and support costs. To provide reliable round-the-clock connectivity to customers in accordance with service level agreements (SLAs), the system 100 utilizes the VNA management platform 153 to remotely manage, monitor, and support the VNA 101. Remotely managing the VNA 101 reduces the operating costs of CPE by aggregating and running the network appliances within a virtual infrastructure. Specifically, the cost of maintaining the server 103 is significantly less than installing hardware network appliances and managing them individually. In addition, the approach of the system 100 recognizes the possibility of remotely managing the VNA 101 from the service provider side via an end-to-end network architecture of EVC. This network architecture allows the service provider to collectively maintain a bundle of equipment configurations from a centralized management platform. In particular, it allows the service provider to track and maintain an inventory of the hardware and software that is installed at each customer site. In addition, it allows the service provider to remotely perform any upgrades without requiring costly site visits.

The approach of the system 100 may be achieved by establishing a management VC to a hypervisor running on a server at a customer premise. In one embodiment, the VNA management platform 153 establishes management VCs to hypervisors (e.g., hypervisor 105) running on servers (e.g., server 103) at various customer premises. The management VC is established, for example, during a boot-up sequence of the server. Next, the system 100 may remotely deploy one or more VNAs to the hypervisor. In one embodiment, the VNA management platform 153 deploys the VNA 101 to the hypervisor 105 installed at the server 103. The system 100 then remotely manages the hypervisor and the one or more VNAs via the management VC. The VNA management platform 153 may, for instance, manage the hypervisor 105 via the management VC by sending messages to the hypervisor. For example, the VNA management platform 153 may route one or more messages to the hypervisor 105 based on a tag value and remotely manage the hardware resources (e.g., CPU 137, memory 139, storage 141, NIC 143, etc.) of the server 103 available to the hypervisor 105. Event messages may then be received from the hypervisor and the VNAs. In one embodiment, the VNA management platform 153 receives real-time event messages from the hypervisor 105 and the VNA 101. Based on the received event messages, the VNA management platform 153 may remotely monitor the hypervisor 105, the VNA 101, and the server 103.

The approach of the system 100 may be further achieved by establishing a second VC to a remote access controller on the server and providing console access to the VNA via the second VC. For example, the VNA management platform 153 may establish a second VC to the remote access controller 113 of the server 103 over the same communication link that the management VC has been established. In one embodiment, the console access allows service provider personnel to directly access the VNA 101 from a control/support center within the service provider network. Various support, configuration, maintenance, and provisioning tasks may be performed at each individual VNA without disrupting server operations. Users may be assigned to one or more levels of access to the hypervisor, the VNAs, and the server. Upon receiving access requests for server job functions from the users, they are authenticated based on their assignment to the one or more levels of access. In one embodiment, the VNA management platform 153 assigns service provider personnel to various levels of access based on their role within the organization. When one of the users attempts to access the server 103 to perform a maintenance task, for instance, the VNA management platform 153 authenticates the user based on the user's level of access. In one embodiment, access may be controlled based on the role (e.g., installer, network manager, technician, etc.) of the user within the service provider organization (e.g., role-based access control).

The approach of the system 100 may further be achieved by establishing backup VCs to a server if the management VC fails. In one embodiment, the VNA management platform 153 detects a failure of the management VC at a first physical interface (e.g., physical interface 109a) of the server 103 and establishes a backup management VC at a second physical interface (e.g., physical interface 109b) of the server 103 over a wireless communication link to the wireless network 121. In one embodiment, the VNA management platform 153 detects a failure on a primary physical interface (e.g., physical interface 109a) if it stops receiving responses to queries or keep-alive messages. For instance, the wireless communication link may be established over a 4$^{th}$ Generation (4G) Long Term Evolution (LTE) or other public/private wireless network that the server 103 connects to via a wireless NID (e.g., a 4G LTE wireless device) that connects to the wireless network 121. In one embodiment, the management VC and the backup management VC are EVC established over an Ethernet trunk.

The approach of the system 100 may further be achieved by establishing one or more data VCs to the one or more VNAs via the first physical interface and routing customer traffic to the one or more VNAs via the one or more data VCs. In one embodiment, the VNA management platform 153 may establish the data VCs to the VNA 101 via the physical interface 109a and route tagged messages destined to the customer based on a tag value. A unique tag value may, for example, be assigned to the customer network 123. For example, the messages may be transmitted by the VNA management platform 153 and carried over the networks 115-121. The tag value carried in the messages may correspond, for instance, with an IEEE 802.1Q VLAN number. In one embodiment, the one or more tagged messages may be forwarded to the hypervisor 105 based on the value of the tag. For example, a virtual router (e.g., virtual router 133) may be configured with routing entries for the tag values contained in the tagged messages received at the physical interface. Based on the routing entry, the virtual router may forward the tagged messages to the appropriate VNA. The tag values may also, for instance, correspond to VLAN numbers utilized by one or more virtual switch VNAs to forward the messages. The VNA management platform 153 may exchange VNA monitoring and management traffic on a specific VLAN.

The approach of the system 100 may be further achieved by establishing one or more other data VCs to the VNAs via a second physical interface of the server and load balancing customer traffic between the data VCs at the first physical interface and the other data VCs at the second physical interface. For example, the VNA management platform 153 may establish a second set of data VCs at the physical interface 109b and route customer traffic to load balance between the data VCs at the physical interface 109a and the physical interface 109b. It is contemplated that additional physical interfaces of the server 103 may be similarly used to provision additional sets of data VCs. In one embodiment, the data VCs are EVCs that connect to a layer 3 (L3) Ethernet service or a layer 2 (L2) Ethernet service of a CEA network. For example, the physical interface 109a of the server 103 may connect to the networks 115-121 via dual Ethernet-over-fiber (e.g., gigabit Ethernet) links.

Figure 2:
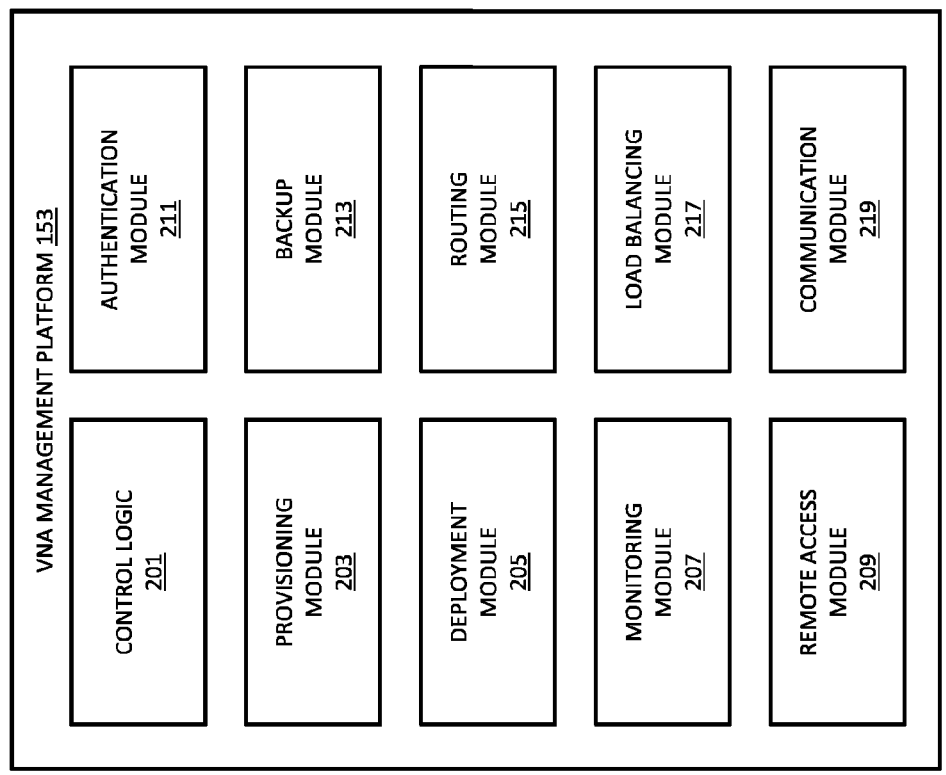
FIG. 2 is a diagram of the components of a VNA management platform, according to an exemplary embodiment.

FIG. 2 is a diagram of the components of the VNA management platform 153, according to an exemplary embodiment. By way of example, the VNA management platform 153 includes one or more components for remotely managing the VNA 101. It is contemplated that the functions of these components may be combined in one or more components or performed by other components of equivalent functionality. In this embodiment, the VNA management platform 153 includes a control logic 201, provisioning module 203, a deployment module 205, a monitoring module 207, a remote access module 209, an authentication module 211, a backup module 213, a routing module 215, a load balancing module 217, and a communication module 219.

The control logic 201 may provide the logic for executing one or more processes and storing information belonging to the various modules. In one embodiment, the control logic 201 controls the steps by which the VNA management platform 153 remotely manages the VNA 101 at various customer premises served by the service provider. For example, the control logic 201 may include one or more processors, application-specific integrated circuits (ASICs) or programmable logic devices (PLDs) that are programmed to execute the remote management of the VNA 101.

The provisioning module 203 may be utilized by the control logic 201 to cause the hypervisor 105 to provision one or more VC. For example, the provisioning module 203 may be utilized to establish data or management VCs to the hypervisor 105 and the VNA 101 running on the server 103. The provisioning module 203 may also be utilized to establish VCs between the hypervisor 105 and the VNA 101. In one embodiment, the VC are established at the virtual interfaces 107 of the VNA 101. In one embodiment, the data and management VCs are EVCs connecting to the server 103 via the physical interfaces 109. The provisioning module 203 may also cause the configuration of VLANs at the virtual interfaces 107 and the physical interfaces 109.

The deployment module 205 may be utilized to remotely deploy the VNA 101 to the hypervisor when the server 103. In one embodiment, the VNA 101 are deployed to the hypervisor 105 when the server 103 is booting up. For example, the deployment module 205 may send tagged messages via a management VC to the hypervisor 105 instructing the hypervisor to allocate hardware resources (e.g., CPU 137, memory 139, storage 141, NIC 143) and instantiate a VM for a VNA. In one embodiment, the deployment module 205 may send messages to the hypervisor 105 instructing it to re-deploy one or more VNA with new or updated software features provided by the VNA management platform 153. For instance, the service provider may be rolling out a new software version for a specific VNA and may utilize the deployment module 205 to perform a controlled upgrade across multiple servers. As part of the deployment, a VNA with an outdated software version may be shut down and its hardware resources may be de-allocated. In one embodiment, the deployment module 205 interacts with the hypervisor 105 to manage the allocation of the hardware resources. In one embodiment, the VNA 101 may be deployed from storage 141 into the memory 139 allocated for the VNA. After deployment is complete, the deployment module 205 may cause the hypervisor 105 to take control of the VNA 101. In one embodiment, the deployment module 205 may transmit software code in a variety of distribution formats to the hypervisor 105. For instance, the software code may be transmitted in serialized or compressed form to allow quick real-time upgrades to the VNA with minimal disruption to the network operations of the customer.

The monitoring module 207 may be utilized by the control logic 201 to remotely monitor the hypervisor 105 and the VNA 101. In one embodiment, the monitoring is performed based on real-time events generated by the hypervisor 105. The real-time events may be received according to various protocols, including simple network management protocol (SNMP) traps and system log (SYSLOG) messages generated by the server 103. The VNA 101 may also generate SNMP and SYSLOG event messages in real-time. In one embodiment, a virtual router or virtual switch VNA may forward the generated messages to the VNA management platform 153 via the management VC established by the provisioning module 203. The monitoring module 207 may also have the capability to detect any communication failures. For instance, the monitoring module 207 may detect the loss of communication to the hypervisor 105 or the VNA 101 if it stops receiving periodic keep-alive messages on the management VC. In one embodiment, the monitoring module 207 may be utilized to supply troubleshooting information collected by the hypervisor 105 to service provider personnel. For example, the monitoring module 207 may be part of a broader network management function associated with the management of the networks 115-121.

The remote access module 209 may be utilized by the control logic 201 to establish console access into the server 103. In one embodiment, the remote access module 209 utilizes the management VC to exchange console access information with the server 103. In one embodiment, remote console access includes a terminal monitor interface that supports a command-line prompt. The console access may be utilized to troubleshoot, monitor, or provision features of a particular VNA remotely from a central monitoring facility of the service provider. In one embodiment, the remote access module 209 interacts with the remote access controller 113 to monitor and manage the server 103. For example, a technician may login to the remote access controller 113 and enter commands at a terminal interface. The remote access module 209 may also provide the capability to remotely access the console of the hypervisor 105. In one embodiment, the remote access module 209 may interact with the provisioning module 203 to establish a separate VC for remote console access.

The authentication module 211 may be utilized by the control logic 201 to enforce secure access to the hypervisor 105, the remote access controller 113, and the VNA 101 via the VNA management platform 153. In one embodiment, the authentication module 211 enforces a role-based access control system. For example, depending on the role (e.g., monitoring, supporting, provisioning technician) of an individual within the service provider's organization, the individual may be assigned to one or more groups. Each group may be associated with a specific set of authorization and authentication policies. In one embodiment, authentication module 211 enforces the authorization and authentication policies by confirming whether a particular user attempting to access the server 103 belongs to a group with the requisite authorization. Upon confirmation, the authentication module 311 authenticates the user based on authentication credentials provided by the user. For example, the authentication module 311 may access an employee database via a secure protocol (e.g., remote authentication dial-in user service (RADIUS), terminal access controller access-control system (TACACS)) within the organization and receive confirmation that the provided credentials match the stored information. In one embodiment, users accessing the server 103 belong to a networking monitoring group, a network management group, or a specific VNA management group. In one embodiment, these groups are associated with one or more corresponding network domains internal to the service provider network infrastructure.

The backup module 213 may be utilized by the control logic 201 to detect a failure of a management VC and establish a backup management VC to the server 103. For instance, the backup module 213 configures and initiates a backup management VC that connects to the server 103 at a second physical interface (e.g., physical interface 109*b*). In one embodiment, the backup VC is established over a wireless communication link connecting to the physical interface 109*b* via a wireless NID at the customer premises. The backup module 213 may receive an indication from the monitoring module 207 that the management VC to the hypervisor 105 has become disconnected. As described above, the monitoring module 207 may detect a loss of communication from the hypervisor 105 based on the expiry of a keep-alive message timer. Upon receiving the indication, the backup module 213 may initiate the backup process by attempting to communicate with the hypervisor 105 via the backup VC. In one embodiment, the backup module 213 may interact with the provisioning module 203 to establish the backup VC. The backup module 213 may also receive an indication from the monitoring module 207 that connectivity to the hypervisor 105 via the primary VC has been restored. In one embodiment, the backup module 213 may take steps to disconnect the backup VC.

The routing module 215 may be utilized by the control logic 201 to route customer traffic to the VNA belonging to the customer. In one embodiment, the routing module 215 examines the message header to determine a tag value. The tag value may be a unique value assigned to a particular customer and may be used to route traffic belonging to the customer. For instance, the tag value may be used to switch a message to an output port of a switching device in the service provider network towards the customer network 123. In one embodiment, the tag value may be assigned to a VNA (e.g., VNA 101*a*) running at the hypervisor 105. For example, the message may be routed to a virtual interface (e.g., virtual interface 107) of a particular VNA based on the tag value assigned to the VNA. In one embodiment, the routing module 215 is utilized to route VNA management traffic to the appropriate VNA. The routing module 215 may interact with the load balancing module 217 if more than one VC connects the server 103 to the service provider.

The load balancing module 217 may be utilized by the control logic 201 to establish one or more other VCs to the VNA and load balance the customer traffic among the VCs. In one embodiment, the load balancing module 217 interacts with the provisioning module 203 to establish VCs at a second physical interface (e.g., physical interface 109*b*) of the server 103. Once established, the load balancing module 217 sends traffic destined to the customer network 123 or the VNA 101 across all data VCs. For example, the load balancing module 217 may cause messages to be load balanced according to a round-robin protocol. In one embodiment, the load balancing module 217 may interact with the routing module 215 to cause the network infrastructure of the service provider network to create multiple routing/forwarding entries for load balancing purposes at various routing/forwarding nodes.

The communication module 219 may be utilized by the control logic 201 to communicate with the server 103. In one embodiment, the communication module 219 may interact with the provisioning module 203, monitoring module 213, routing module 215, and backup module 213 to exchange messages with the server 103. For instance, the communication module 219 may connect to a L2 transport network (e.g., a CEA network) located within the service provider network 115. The communication module 219 may also be utilized to communicate with other parts of the service provider network, including network management and monitoring systems. It is contemplated that the VNA management platform 153 may utilize various network management protocols (e.g., SNMP) to exchange network management information.

Figure 3A:
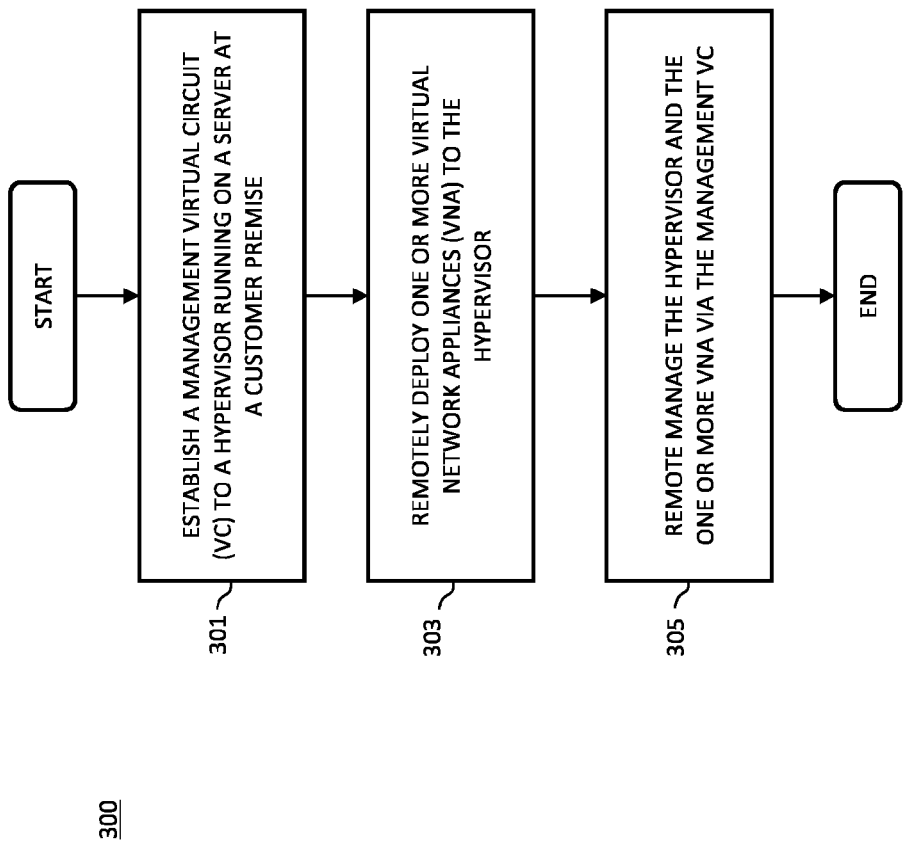
FIGS. 3A through 3G illustrate flowcharts for processes to remotely manage a VNA, according to an exemplary embodiment.
Figure 9:
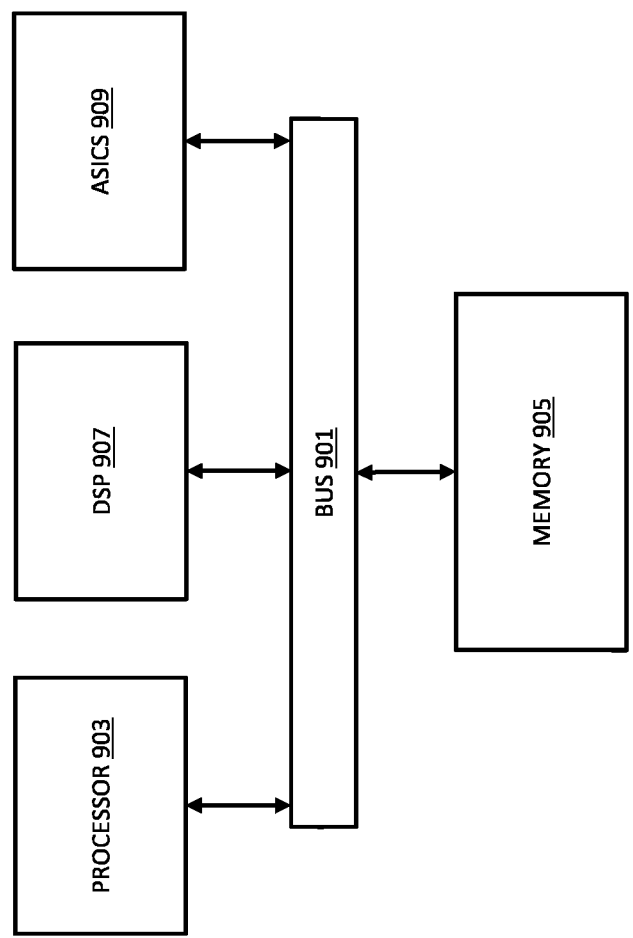
FIG. 9 is a diagram of a chip set that can be used to implement various exemplary embodiments.

FIG. 3A illustrates a flowchart for a process 300 to remotely manage a VNA, according to an exemplary embodiment. In one embodiment, the VNA management platform 153 performs the process 300 of FIG. 3A and is implemented in, for instance, a chip set including a processor and a memory as shown in FIG. 9. For illustrative purposes, reference may be made to the system 100 in FIG. 1A. In step 301, a management VC is established to the hypervisor 105 running on the server 103 at a customer premise. In one embodiment, the provisioning module 203 of the VNA management platform 153 may be utilized to establish the management VC. The management VC may be established, for instance, when the server 103 is booting up or during regular operation and may be utilized to manage the hypervisor 105 and the VNA 101. In one embodiment, the management VC is established to a destination address based on a public network address (e.g., Internet protocol (IP) address) of the hypervisor 105. In step 303, one or more VNA may be remotely deployed to the hypervisor 105. For example, the deployment module 205 of the VNA management platform 153 may be utilized to remotely install the VNA 101 to the hypervisor 105. In one embodiment, the deployment may occur via a download of a self-executing installation package from the VNA management platform 153. In step 305, the VNA management platform 153 may remotely manage the hypervisor 105 and the VNA 101. For example, the monitoring module 207 of the VNA management platform 153 may receive periodic status messages from the server 103. In one embodiment, the status messages uniquely identify the hypervisor 105 and provide real-time updates of its operation. On the basis of the received status information, the monitoring module 207 may invoke the backup module 213 or load balancing module 217, if needed. The status messages may contain detailed configuration information of the server 103.

Figure 3C:
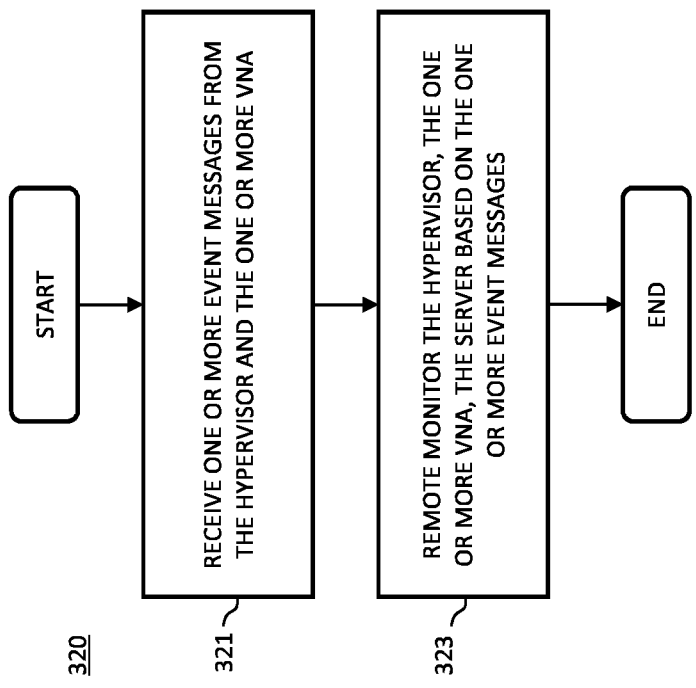
Figure 3B:
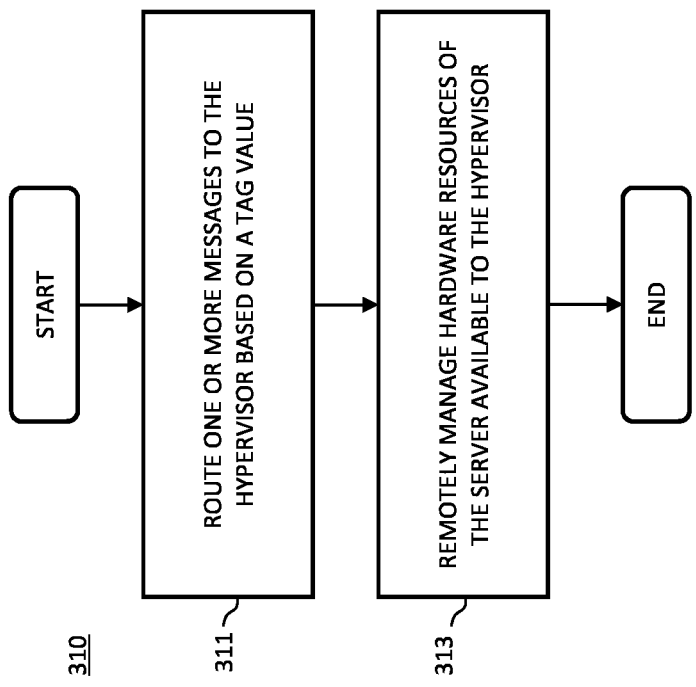

FIG. 3B illustrates a flowchart for a process 310 to remotely manage a VNA, according to an exemplary embodiment. In one embodiment, the VNA management platform 153 performs the process 310 of FIG. 3B and is implemented in, for instance, a chip set including a processor and a memory as shown in FIG. 9. For illustrative purposes, reference may be made to the system 100 in FIG. 1A. In step 311, one or more messages are routed to the hypervisor 105 based on a tag value. In one embodiment, the routing module 215 of the VNA management platform 153 causes management messages to be routed to the appropriate hypervisor (e.g., hypervisor 105) based on a unique tag value embedded in the messages. These messages may be utilized to command or query the hypervisor 105. For instance, the messages may request information on the configuration of the server 103 and the number of its physical interfaces 109. In step 313, the hardware resources of the server may be remotely managed. For example, the deployment module 205 of the VNA management platform 153 may query the hypervisor 105 to obtain the hardware resources (e.g., CPU 137, memory 139, storage 141, NIC 143) of the server 103 and determine whether and how many VNA the server 103 can support. In one embodiment, the deployment module 205 may de-allocate or re-allocate the hardware resources of the server 103 in order to deploy a newer software version or to perform other management tasks.

FIG. 3C illustrates a flowchart for a process 320 to remotely manage a VNA, according to an exemplary embodiment. In one embodiment, the VNA management platform 153 performs the process 320 of FIG. 3C and is implemented in, for instance, a chip set including a processor and a memory as shown in FIG. 9. For illustrative purposes, reference may be made to the system 100 in FIG. 1A. In step 321, one or more event messages are received from the hypervisor 105 and the VNA 101. In one embodiment, the event messages are real-time event messages collected by the hypervisor 105. For instance, the event messages may provide an indication of a hardware or software failure. In step 323, the hypervisor 105, the VNA 101, and the server 103 may be remotely monitored based on the event messages. In one embodiment, the event messages received from the hypervisor 105 may be utilized by the monitoring module 207 to obtain real time information about the operations of various software components. Based on the information, the monitoring module 207 may invoke one or more other modules (e.g., backup module 213, deployment module 205, or provisioning module 203).

Figure 3E:
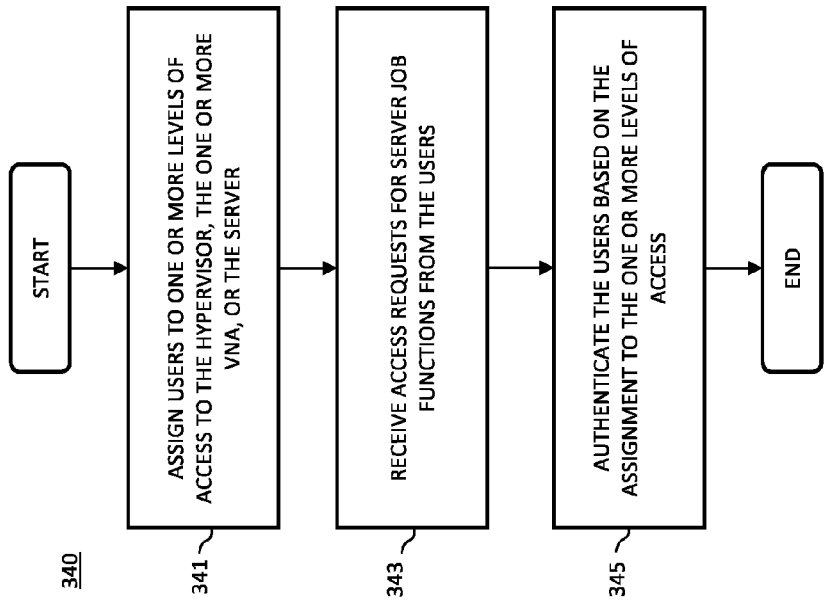
Figure 3D:
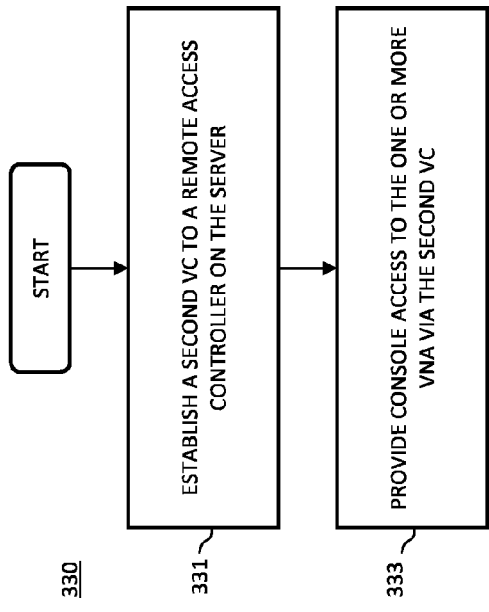

FIG. 3D illustrates a flowchart for a process 330 to remotely manage a VNA, according to an exemplary embodiment. In one embodiment, the VNA management platform 153 performs the process 330 of FIG. 3D and is implemented in, for instance, a chip set including a processor and a memory as shown in FIG. 9. For illustrative purposes, reference may be made to the system 100 in FIG. 1A. In step 331, a second VC may be established to the remote access controller 113 on the server 103. For example, the provisioning module 203 may be utilized to establish the second VC based on a public network address (e.g., IP address) assigned to the remote access controller 113. In one embodiment, the VC may be a L2 VC that is automatically provisioned when the server 103 powers up. The second VC may be connected to the remote access controller 113 via the same physical interface of the server 103 as a management VC connecting to the hypervisor 105. In step 333, console access to the one or more VNA 101 is provided via the second VC. For example, the remote access module 209 may be utilized to provide a console interface to the hypervisor 105 or one or more of the VNA 101. As previously described, console access may be used by the service provider to obtain detailed technical information from each of the VNA 101 or the hypervisor 105. The information may be used to troubleshoot the server 103 or to perform routine maintenance tasks. In one embodiment, the console interface is a command-line interface that emulates various terminals according to standard protocols.

FIG. 3E illustrates a flowchart for a process 340 to remotely manage a VNA, according to an exemplary embodiment. In one embodiment, the VNA management platform 153 performs the process 340 of FIG. 3E and is implemented in, for instance, a chip set including a processor and a memory as shown in FIG. 9. For illustrative purposes, reference may be made to the system 100 in FIG. 1A. In step 341, users may be assigned to one or more levels of access to the hypervisor, the VNA 101, or the server 103. For example, the authentication module 211 of the VNA management platform 153 may be responsible for the implementation of any access control procedures. In one embodiment, the authentication module 211 may be utilized to setup specific access levels and configure one or more users with access at those levels. The assignment information may be received from an employee database or from manually input instructions to set up a role-based access control system. In step 343, access requests are received at the authentication module 211. The access request may include, for instance, login information supplied by a user at a management or monitoring terminal located within the service provider network. Alternatively, the access request may be received from an on-site technician that is accessing the VNA management platform 153 remotely. In step 345, the users are authenticated based on their respective assignment to one or more levels of access. In one embodiment, the authentication module 211 checks authentication credentials and confirms whether the authenticated user has the requisite authorization. Users may be assigned to more than one level of access depending on their role within the organization. For instance, a user may have both a high-level authorization (e.g., to perform a server configuration) as well as one or more lower levels of authorization (e.g., to monitor the server 103).

Figure 3G:
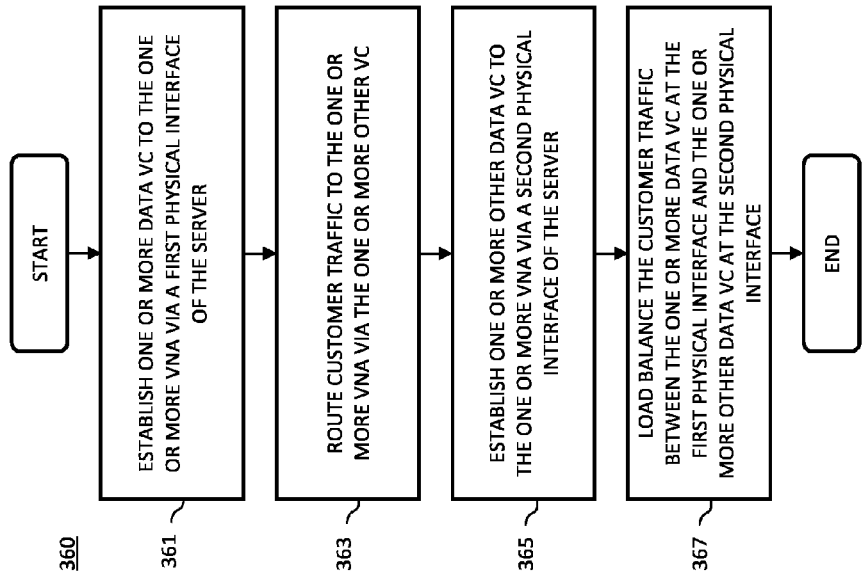
Figure 3F:
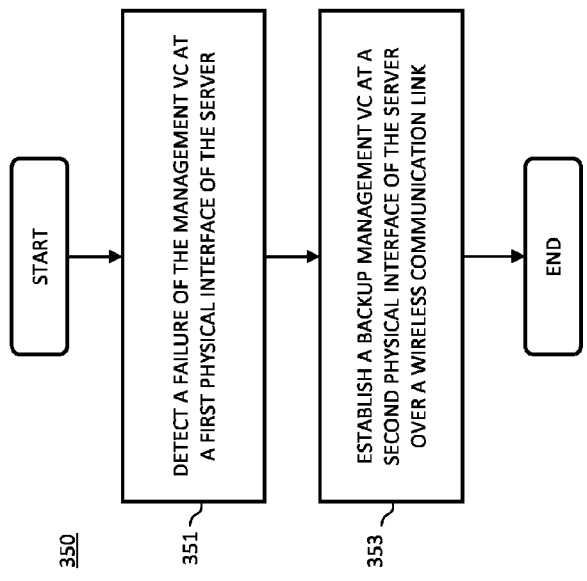

FIG. 3F illustrates a flowchart for a process 350 to remotely manage a VNA, according to an exemplary embodiment. In one embodiment, the VNA management platform 153 performs the process 350 of FIG. 3F and is implemented in, for instance, a chip set including a processor and a memory as shown in FIG. 9. In step 351, a failure of a management VC at a first physical interface of the server 103 is detected. In one embodiment, the monitoring module 207 of the VNA management platform 153 is the first to detect a loss of connectivity to the server 103. For example, a timer associated with periodic keep-alive messages from the server 103 may have expired. In step 353, a backup management VC may be established to the server 103 via a wireless communication link. In one embodiment, the backup module 213 may be invoked by the monitoring module 207 to cause a backup VC to be created. For example, the backup VC may be routed to the server 103 via the same path as the failed VC except for a last leg, which is provided by a public or private wireless network. In one embodiment, the backup VC is created across a 4G LTE wireless network to a wireless NID connecting to a second physical interface (e.g., physical interface 109b) of the server 103. The backup module 213 may verify that the backup VC is fully functional before returning control to the control logic 201.

FIG. 3G illustrates a flowchart for a process 360 to remotely manage a VNA, according to an exemplary embodiment. In one embodiment, the VNA management platform 153 performs the process 360 of FIG. 3G and is implemented in, for instance, a chip set including a processor and a memory as shown in FIG. 9. In step 361, one or more data VC are established to the VNA 101 via a first physical interface (e.g., physical interface 109a) of the server 103. The data VC may be established by the provisioning module 203 of the VNA management platform 153. In one embodiment, the data VC carry customer data separately from management data. For example, the data VC may be an EVC connecting to one or more L2 or L3 network services (e.g., EVPL, VPLS, IDE, and PIPE). In step 363, customer traffic is routed to the VNA 101 via the data VC. For example, the routing module 215 of the VNA management platform 153 may have been utilized to create routing/forwarding entries throughout the service provider network. In one embodiment, customer data is routed to the VNA 101 based on the tag value in the messages. In step 365, the provisioning module 203 may be utilized to establish one or more other data VC to the VNA 101 via a second physical interface (e.g., physical interface 109b) of the server 103. In step 367, the load balancing module 217 may be utilized to setup the routing information for the service provider network such that customer data is transmitted to the server 103 via both the data VC at both the first and second physical interfaces. In one embodiment, the load balancing module 217 may supplement the routing information generated by the routing module 215 with additional routing/forwarding entries pointing to the second physical interface.

Figure 4:
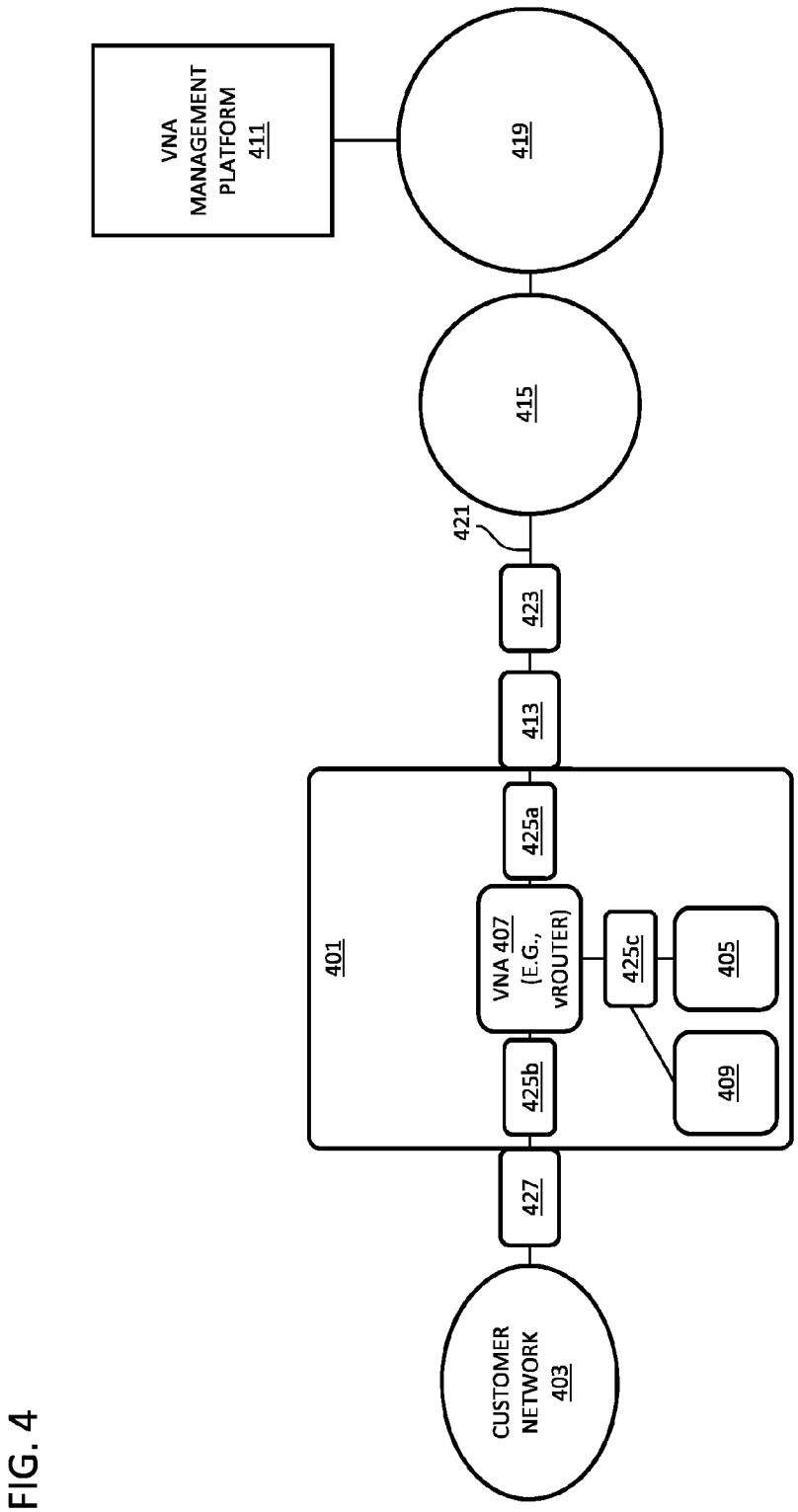
FIG. 4 illustrates a single-circuit VNA management configuration, according to an exemplary embodiment.

FIG. 4 illustrates a single-circuit configuration, according to an exemplary embodiment. In one embodiment, the server 401 is installed at a customer premise of the customer network 403. For example, the server 401 may be located in a demilitarized zone (DMZ) that protects the customer network 403 from various intrusion attacks originated from an external network.

The server 401 may be configured to run a bare-metal hypervisor 405 and at least one VNA 407 (e.g., vROUTER). In one embodiment, the VNA 407 runs within a VM hosted by the hypervisor 405. The server 401 may also include a remote access controller 409. In one embodiment, the remote access controller 409 is a ROM-based program that communicates with the VNA management platform 411 during a booting or other initialization sequence. The remote access controller 409 may be a software or firmware component that includes a remote login facility for secure access to the server 401 via an in-band or an out-of-band communication channel. As used herein, the term "out-of-band" may be used to refer to a communication channel that only carries traffic utilized to manage a VNA (e.g., VNA 407) or a hypervisor (e.g., hypervisor 405) installed on a server. In one embodiment, the out-of-band channel is provisioned on a communication link connecting a default physical interface (e.g., physical interface 413) of a server to the CEA network 415 via a NID (e.g., NID 417).

As shown, the server 401 has at least one network-facing physical interface 413. In one embodiment, the physical interface 413 is an Ethernet interface that connects to a CEA network 415 and an L2/L3 transport network 419. In one embodiment, the physical interface 413 is a fiber optic interface configured for an Ethernet trunk 421 (e.g., IEEE 802.1Q trunk). The NID 423 may demarcate a boundary between a customer premises (including customer network 403) and the CEA network 415 of the service provider. In one embodiment, the L2/L3 transport network 419 provides L2/L3 frame/packet switching services. L2 services may include, for example, Ethernet virtual private LAN Services (EVPLS) and virtual private LAN services (VPLS); L3 services may include, for example, IDE and PIPE services.

The hypervisor 405, remote access controller 409, and VNA 407 may connect to the L2/L3 transport network 419 via one or more VC. In one embodiment, the remote access controller 409 is configured with a specific management EVC that automatically connects to the CEA network 415 upon server boot-up. The management EVC may be utilized by the VNA management platform 411 to remotely access and perform maintenance tasks on the server 401. Such tasks may include, for instance, upgrade of various software components, including the hypervisor 405 and any VM (e.g., VNA 407). In one embodiment, the VC is an out-of-band EVC circuit carried by the Ethernet trunk 421.

It is contemplated that a variety of internal frame/packet switching/routing paths may be configured within the server 401 depending on the needs of a customer. In one embodiment, the switching/routing paths may re-direct messages received at the physical interfaces (e.g., physical interface 413) to the appropriate VNA (e.g., VNA 407). To enable packet switching among the VNA, one or more virtual switches 425a-425c (collectively referred to virtual switches 425) may also be hosted by the hypervisor 405. Like their physical counterparts, the virtual switches 425 may provide L2 frame switching capabilities and switch messages according to a destination frame address. In one embodiment, the virtual switches 425 may interconnect other VNA. For instance, the VNA 407 connects to the physical interface 413 via the virtual switch 425a, to the physical interface 427 via the virtual switch 425b, and to the hypervisor 405 via the virtual switch 425c. In one embodiment, the physical interface 427 is an Ethernet interface configured as an 802.1Q trunk.

Figure 5:
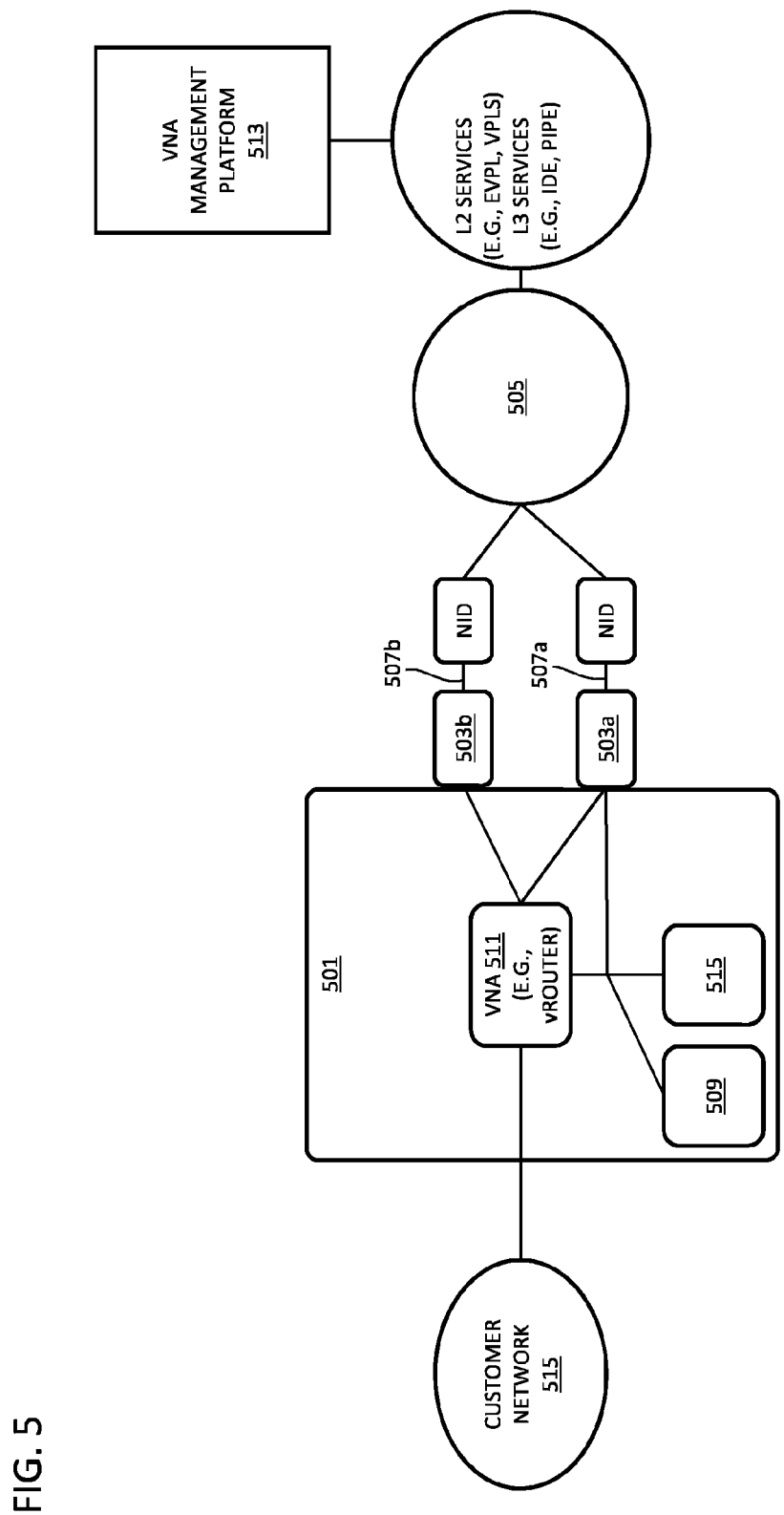
FIG. 5 illustrates a dual-circuit VNA management configuration, according to an exemplary embodiment.

FIG. 5 illustrates a dual-circuit configuration, according to an exemplary embodiment. As shown, the server 501 may have multiple physical interfaces 503a-503b (collectively referred to as physical interfaces 503) connecting to a CEA network 505. In one embodiment, both the first physical interface 503a and the second physical interface 503b connect to the CEA network 505 via Ethernet trunks 507a and 507b, respectively. In one embodiment, the dual-circuit configuration of FIG. 5 is a backup configuration in which the Ethernet trunk 507b acts as a backup link to the Ethernet trunk 507a. If, for example, the remote access controller 509 of the server 501 determines that the Ethernet trunk 507a has failed, the backup Ethernet trunk 507b may be triggered to activate. In one embodiment, the physical interface 503b may be configured to track the state of the physical interface 503a and determine if it has failed. Upon detecting its failure, the physical interface 503b may activate and start forwarding customer traffic. In one embodiment, the VNA 511 (e.g., vROUTER) may be configured to begin routing/forwarding traffic to the CEA network 505 via the physical interface 503b instead of the physical interface 503a after the failure causes one or more routing/forwarding entries in a routing table of the VNA 511 to expire. The configuration of the physical interface 503b may be identical to that of the physical interface 503a such that the backup process operates transparently and without interruption to the routing of messages between the VNA management platform 513 and the VM hosted by the hypervisor 515.

It is contemplated that the second physical interface 503b may be utilized for load-balancing purposes. For example, traffic to and from the customer network 515 may be distributed over the two Ethernet trunks 507 to prevent overloading of any one trunk. In one embodiment, one or more additional EVC may be established between the physical interface 503b and one or more VNA. Traffic belonging to one set of VNA may arrive at the first physical interface 503a and be routed via a first set of EVC. Similarly, traffic to another set of VNA may arrive at the second physical interface 503b and be routed to the other set of VNA via a second set of EVC.

Figure 6:
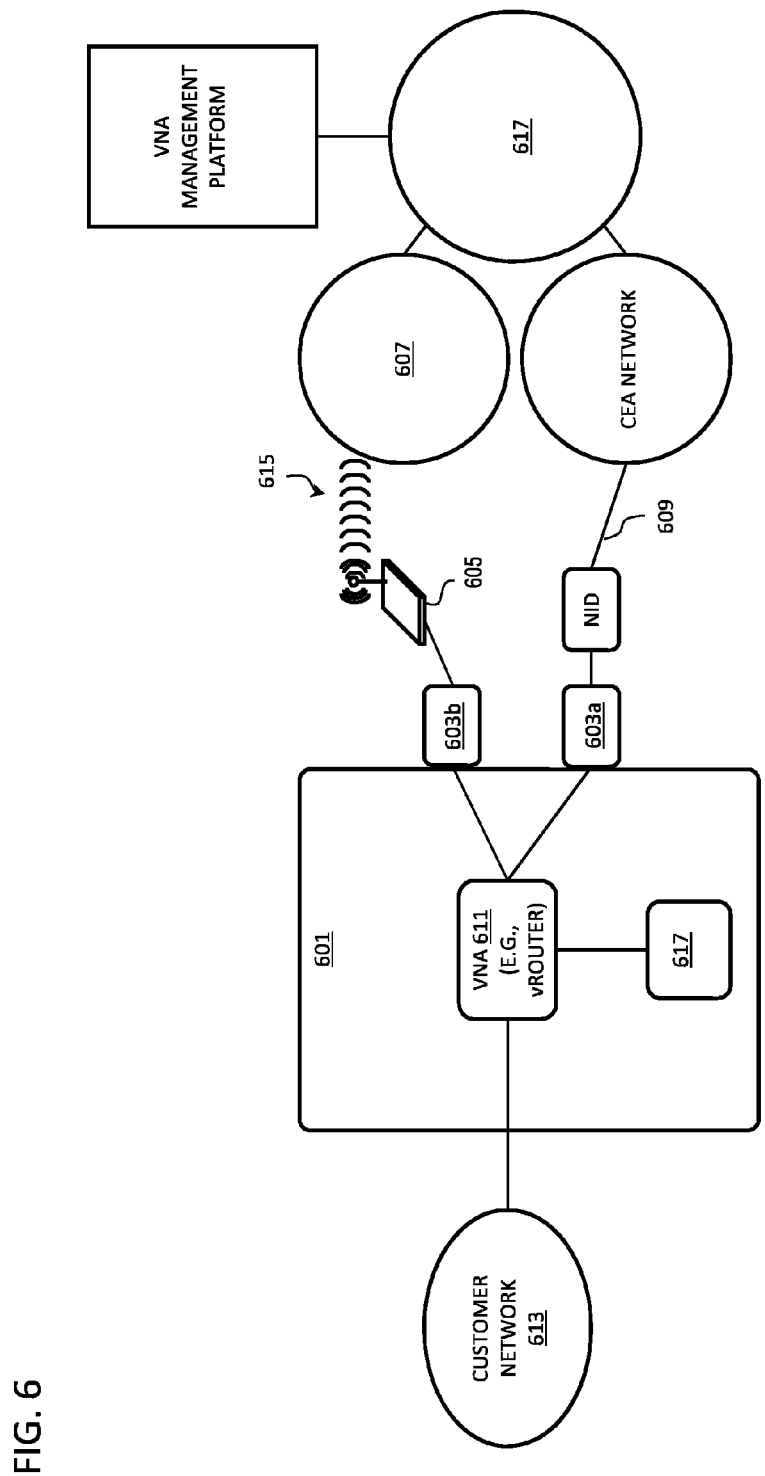
FIG. 6 illustrates a wireless backup VNA management configuration, according to an exemplary embodiment.

FIG. 6 illustrates a wireless backup circuit configuration, according to an exemplary embodiment. As shown, the server 601 may have two physical interfaces 603a-603b (collectively referred to physical interfaces 603). In one embodiment, one of the physical interfaces may provide a backup connection to the other physical interface. For example, a wireless device 605 (e.g., 4G LTE device) connected to the physical interface 603b may temporarily provide connectivity via a public or private wireless network 607 (e.g., 4G network) in case of a failure affecting the primary link 609. When the primary link 609 fails, the VNA 611 (e.g., vROUTER) hosted at the server 601 may route/forward traffic from the customer network 613 via the wireless link 615. For instance, the VNA 611 may be configured to trigger a shutdown of the physical interface 603a and clear any routing/forwarding entries pointing to the failed interface. In place of a routing entry to the failed interface, the VNA 611 may install a static backup routing entry or dynamically obtain routing information from the service provider via the wireless link 615 (after the wireless link 615 is operational). As in the case of the exemplary dual-circuit configuration in FIG. 5, it is contemplated that the wireless backup circuit configuration in FIG. 6 may be utilized for load balancing purposes. For instance, customer network traffic may be routed/forwarded over both the physical interfaces 603a and 603b. In one embodiment, the primary link 609 supports L2 and L3 services 617 (e.g., EVPL, VPLS, IDE, and PIPE) and the wireless link 615 only supports L3 traffic.

Figure 7A:
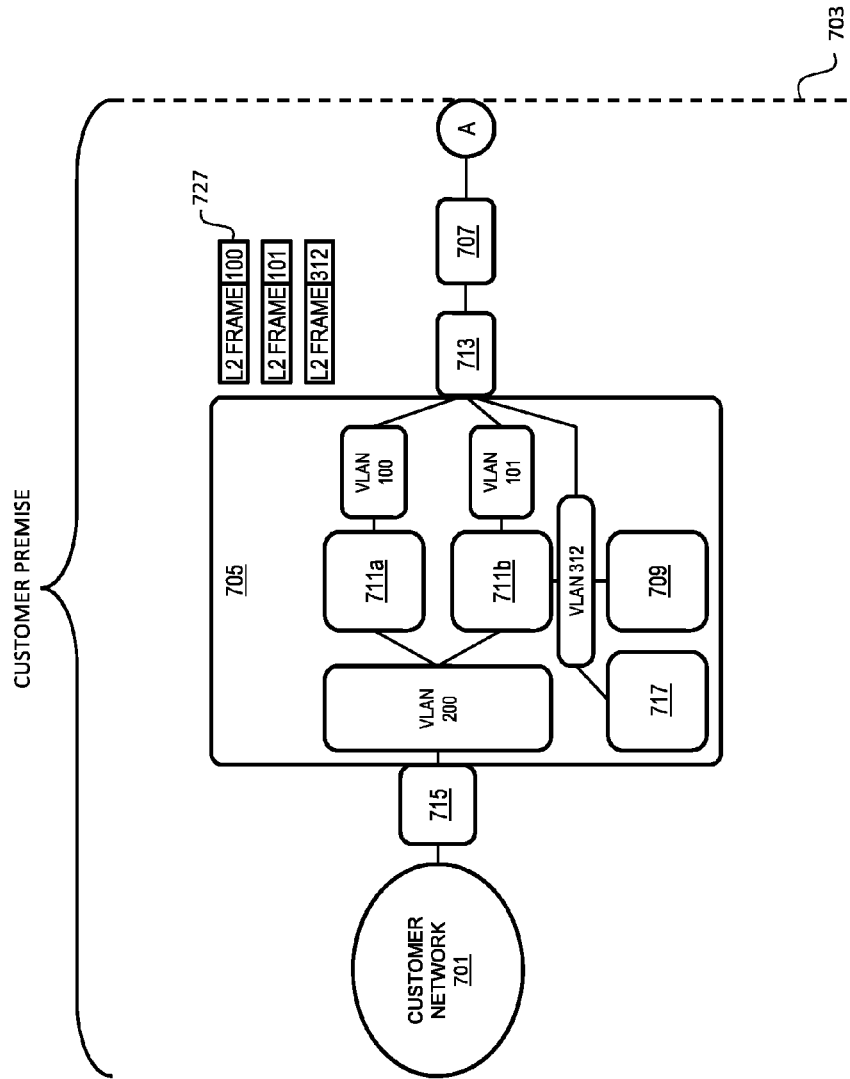
FIGS. 7A and 7B illustrate an end-to-end network architecture for VNA management, according to an exemplary embodiment.
Figure 7B:
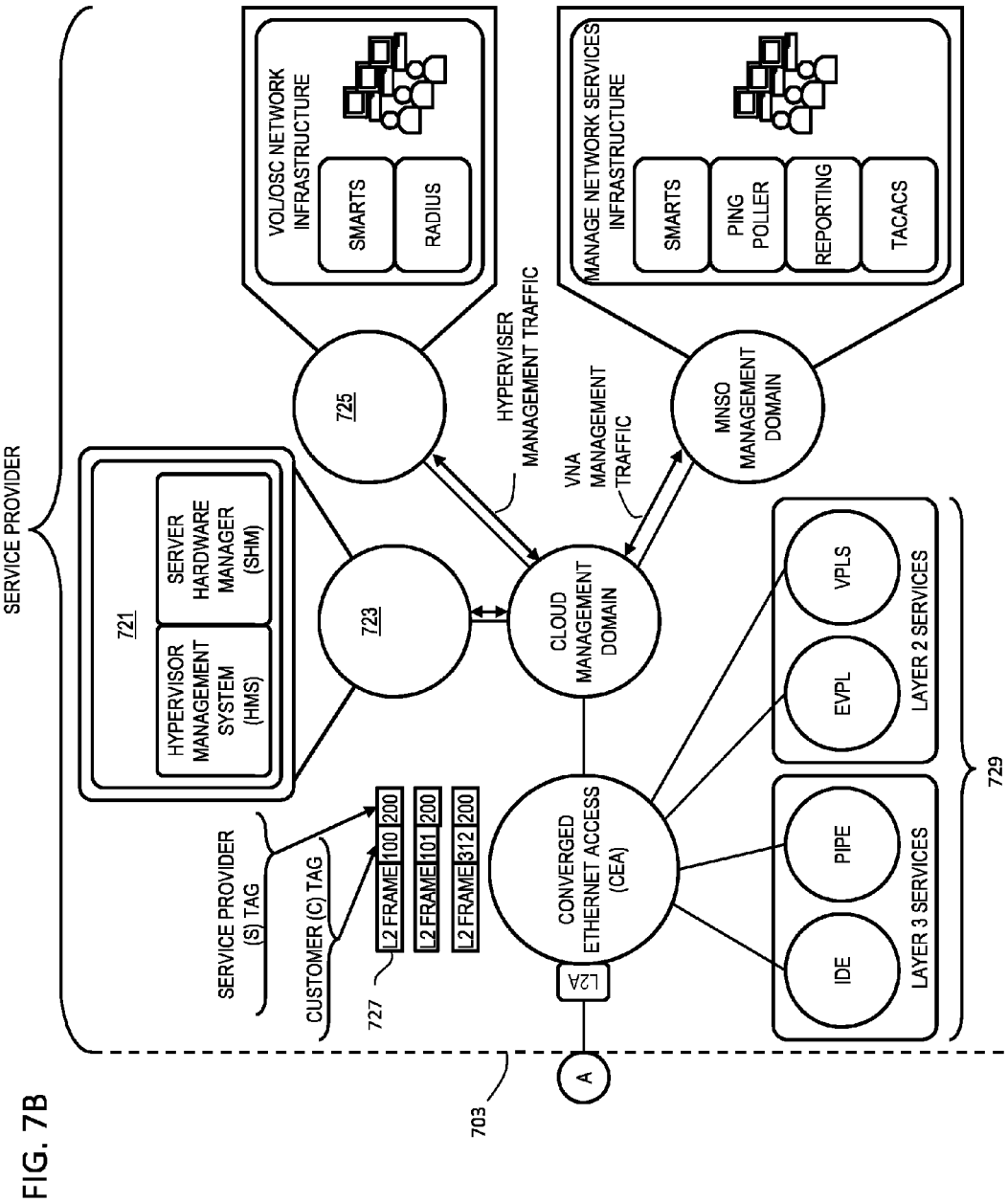

FIGS. 7A and 7B illustrate an end-to-end network architecture for VNA management, according to an exemplary embodiment. FIG. 7A illustrates a customer premise network, according to an exemplary embodiment. As shown in FIG. 7A, the customer network 701 extends to a demarcation point 703 lying between the server 705 and the service provider network. For example, the customer premises may extend to the NID 707. The server 705 is operated by the hypervisor 709 and hosts one or more VM 711. As shown, the server 705 hosts two VM 711a and 711b (collectively referred to as VM 711). As further shown, the server 705 has two physical interfaces 713 and 715. The physical interface 713 connects to the customer network 701 and the physical interface 715 connects to the NID 707 near the demarcation point 703. In one embodiment, the physical interface 713 is configured as an Ethernet 802.1Q trunk and receives Ethernet traffic for the VLAN 100 and 101. The physical interface 715 is also configured as an Ethernet 802.1Q trunk and receives Ethernet traffic for the VLAN 200. The hypervisor 709 and the remote access controller 717 belong to a dedicated management VLAN 312 to receive system management and maintenance messages.

The server 705 may receive tagged frames via the 802.1Q trunk and a virtual router (e.g., VM 711a) may forward the traffic according to the value of the tag. For example, Ethernet frames with tag values of 100 and 101 may be forwarded to the VM 711a. System management messages may be assigned a unique tag value. For instance, an Ethernet frame with a tag value of 312 may be forwarded to the hypervisor 709. In one embodiment, the VM 711, hypervisor 709, and remote access controller 717 may receive messages via their respective VLANs.

FIG. 7B illustrates a service provider network, according to an exemplary embodiment. As shown, the service provider network begins at the demarcation point 703. The VNA management platform 153 shown in FIG. 2 may be implemented in a distributed form. For instance, the functionality of the provisioning module 203, and deployment module 205 may be implemented separately from the monitoring module 207 and the backup module 213 of the VNA management platform 153 in FIG. 2. In one embodiment, the provisioning module 203, and deployment module 205 may be implemented within a VNA network infrastructure monitoring system 721 that lies within a management network domain 723. The management network domain 723 may reside within a separate network domain such that management traffic does not mix with customer traffic. In one embodiment, the monitoring module 207 and the backup module 213 may be implemented in an operations management domain 725.

In one embodiment, the management and customer traffic may traverse the same communication link to reach the server 705. A virtual router (e.g., VM 711a) at the server 705 may then forward the traffic to another VNA (e.g., VM 711b) or to the customer network 701. In one embodiment, the messages are Ethernet frames. Each Ethernet frame may have a source and a destination tag for proper routing and forwarding. For example, the frame 727 has a customer tag of 100 indicating that the frame destination is the VLAN 100 that connects to the VM 711a. The frame 727 also has a source tag of 200 indicating that it originates from the service provider network.

In one embodiment, the customer traffic may originate from various L2 and L3 transport services 729 (e.g., EVPL, VPLS, IDE, and PIPE). The L2 and L3 transport services carry customer traffic between the customer network and various sources or destinations on interconnecting networks that are either a part of the service provider's network or a part of other external networks (not shown).

FIG. 8 illustrates computing hardware (e.g., computer system) upon which an embodiment according to the invention can be implemented. The computer system 800 includes a bus 801 or other communication mechanism for communicating information and a processor 803 coupled to the bus 801 for processing information. The computer system 800 also includes main memory 805, such as RAM or other dynamic storage device, coupled to the bus 801 for storing information and instructions to be executed by the processor 803. Main memory 805 also can be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a LAN card (e.g. For Ethernet™ or an Asynchronous Transfer Model (ATOM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 9 illustrates a chip set 900 upon which an embodiment of the invention may be implemented. Chip set 900 is programmed to remote manage VNA as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of FIGS. 3A through 3G.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more ASIC 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) For storing executable instructions that when executed perform the inventive steps described herein to controlling a set-top box based on device events. The memory 905 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   establishing, by a management platform of a service provider, a management virtual circuit (VC) to a hypervisor,
      the hypervisor running on a server at a customer premise remote from the management platform,
         the hypervisor establishing a resource pool comprising a plurality of hardware resources of the server;
   providing, by the management platform, instructions to the hypervisor to deploy one or more virtual network appliances (VNAs),
      the hypervisor managing allocation of the plurality of hardware resources to deploy the one or more VNAs;
   routing, by the management platform, a message to the hypervisor based on a tag value associated with the message,
      the tag value identifying a particular VNA of the one or more VNAs;
   remotely managing, by the management platform via the management VC and based on routing the message, the hypervisor and the one or more VNAs;
   detecting, by the management platform, a failure of the management VC at a first physical interface of the server; and
   establishing, by the management platform, a backup management VC at a second physical interface of the server over a wireless communication link,
      the management VC and the backup management VC being Ethernet VCs (EVCs) established over an Ethernet trunk.

2. The method of claim 1, further comprising:
   receiving one or more event messages from the hypervisor and the one or more VNAs; and
   remotely monitoring, based on the one or more event messages, at least one of:
      the hypervisor,
      the one or more VNAs, or
      the server.

3. The method of claim 1, further comprising:
   establishing a second VC between the management platform and a remote access controller on the server; and
   providing console access to the one or more VNAs via the second VC.

4. The method of claim 1, further comprising:
   assigning users to one or more levels of access to at least one of:
      the hypervisor,
      the one or more VNAs, or
      the server;
   receiving access requests for server job functions from the users; and
   authenticating the users based on assigning the users to the one or more levels of access.

5. The method of claim 1, further comprising:
   establishing one or more data VCs to the one or more VNAs via a first third physical interface of the server; and
   routing customer traffic to the one or more VNAs via the one or more data VCs.

6. The method of claim 5, further comprising:
establishing one or more other data VCs to the one or more VNAs via the second physical interface of the server; and
load balancing the customer traffic between the one or more data VCs at the third physical interface and the one or more other data VCs at the second physical interface.

7. An apparatus comprising:
at least one processor to:
establish a management virtual circuit (VC) to a hypervisor,
the hypervisor running on a server at a remote customer premise,
the hypervisor establishing a resource pool comprising a plurality of hardware resources of the server;
provide instructions to the hypervisor to deploy one or more virtual network appliances (VNAs),
the hypervisor managing allocation of the plurality of hardware resources to deploy the one or more VNAs;
route a message to the hypervisor based on a tag value associated with the message,
the tag value identifying a particular VNA of the one or more VNAs;
remotely manage, via the management VC and based on routing the message, the hypervisor and the one or more VNAs;
detect a failure of the management VC at a first physical interface of the server; and
establish a backup management VC at a second physical interface of the server over a wireless communication link,
the management VC and the backup management VC being Ethernet VCs (EVCs) established over an Ethernet trunk.

8. The apparatus of claim 7, wherein the at least one processor is further to:
receive one or more event messages from the hypervisor and the one or more VNAs; and
remotely monitor, based on the one or more event messages, at least one of:
the hypervisor,
the one or more VNAs, or
the server.

9. The apparatus of claim 7, wherein the at least one processor is further to:
establish a second VC to a remote access controller on the server; and
provide console access to the one or more VNAs via the second VC.

10. The apparatus of claim 7, wherein the at least one processor is further to:
assign users to one or more levels of access to at least one of:
the hypervisor,
the one or more VNAs, or
the server;
receive access requests for server job functions from the users; and
authenticate the users based on assigning the users to the one or more levels of access.

11. The apparatus of claim 7, wherein the at least one processor is further to:
establish one or more data VCs to the one or more VNAs via a third physical interface of the server; and
route customer traffic to the one or more VNAs via the one or more data VCs,
wherein the customer traffic comprises one or more tagged messages.

12. The apparatus of claim 11, wherein the at least one processor is further to:
establish one or more other data VCs to the one or more VNAs via the second physical interface of the server; and
load balance the customer traffic between the one or more data VCs at the third physical interface and the one or more other data VCs at the second physical interface.

13. A system comprising:
a virtual network appliance (VNA) management platform, remote from a customer premise, to:
establish a management virtual circuit (VC) to a hypervisor,
the hypervisor running on a server at the customer premise,
the hypervisor establishing a resource pool comprising a plurality of hardware resources of the server;
provide instructions to the hypervisor to deploy one or more VNAs, the hypervisor managing allocation of the plurality of hardware resources to deploy the one or more VNAs;
route one or more messages to the hypervisor based on a tag value associated with the one or more messages,
the tag value identifying a particular VNA of the one or more VNAs;
remotely manage the hypervisor and the one or more VNAs;
detect a failure of the management VC at a first physical interface of the server; and
establish a backup management VC at a second physical interface of the server over a wireless communication link,
the management VC and the backup management VC being Ethernet VCs (EVCs) established over an Ethernet trunk.

14. The method of claim 1, wherein routing the message to the hypervisor comprises:
routing the message to a virtual interface of the particular VNA.

15. The apparatus of claim 7, wherein the at least one processor, when routing the message to the hypervisor, is to:
route the message to a virtual interface of the particular VNA.

16. The system of claim 13, wherein the VNA management platform, when routing the one or more messages to the hypervisor, is to:
route the one or more messages to a virtual interface of the particular VNA.

17. The system of claim 13, wherein the VNA management platform is further to:
receive one or more event messages from the hypervisor and the one or more VNAs; and
remotely monitor, based on the one or more event messages, at least one of:
the hypervisor,
the one or more VNAs, or
the server.

18. The system of claim 13, wherein the VNA management platform is further to:
establish a second VC between the management platform and a remote access controller on the server; and provide console access to the one or more VNAs via the second VC.

19. The system of claim 13, wherein the VNA management platform is further to:
assign users to one or more levels of access to at least one of:
the hypervisor,
the one or more VNAs, or
the server;
receive access requests for server job functions from the users; and
authenticate the users based on assigning the users to the one or more levels of access.

20. The system of claim 13, wherein the VNA management platform is further to:
establish one or more data VCs to the one or more VNAs via a third physical interface of the server; and
route customer traffic to the one or more VNAs via the one or more data VCs.

* * * * *